United States Patent [19]

Körschen et al.

[11] Patent Number: 6,063,180
[45] Date of Patent: May 16, 2000

[54] USE OF FREE-FLOWING, MAGNETIC IRON OXIDE CONTAINING GRANULES WITH 50 TO 73 WT. % IRON CONTENT

[75] Inventors: Wolfgang Körschen, Moers; Ulrich Meisen, Krefeld, both of Germany

[73] Assignee: Bayer AG, Germany

[21] Appl. No.: 09/094,408

[22] Filed: Jun. 9, 1998

[30] Foreign Application Priority Data

Jun. 16, 1997 [DE] Germany .......................... 197 25 390

[51] Int. Cl.[7] .............................. C09D 5/23; G03G 9/083
[52] U.S. Cl. .................. 106/456; 106/460; 106/31.64; 106/31.32; 252/62.54; 252/62.56; 399/27; 399/28; 430/106.6; 430/39
[58] Field of Search .................... 252/62.54, 62.56; 106/460, 456, 31.64, 31.32; 399/27, 28; 430/39, 106.6

[56] References Cited

U.S. PATENT DOCUMENTS

| | | |
|---|---|---|
| 802,928 | 10/1905 | Fireman . |
| 4,303,749 | 12/1981 | Gruber et al. ............................ 430/39 |
| 4,369,265 | 1/1983 | Buxbaum et al. ..................... 523/212 |
| 4,394,469 | 7/1983 | Stratta et al. ........................... 523/212 |
| 4,409,300 | 10/1983 | Ohkawa et al. ........................ 428/695 |
| 4,810,305 | 3/1989 | Braun et al. ............................ 106/499 |
| 4,990,189 | 2/1991 | Wiese et al. ............................ 106/456 |
| 5,002,609 | 3/1991 | Rademachers et al. ................ 106/456 |
| 5,035,748 | 7/1991 | Burow et al. ........................... 106/499 |
| 5,401,313 | 3/1995 | Supplee et al. ......................... 106/712 |
| 5,718,755 | 2/1998 | Köhler et al. ........................... 106/456 |

FOREIGN PATENT DOCUMENTS

| | | |
|---|---|---|
| 70 117 A2 | 1/1983 | European Pat. Off. . |
| 23 265 | 7/1983 | European Pat. Off. . |
| 90 396 | 5/1986 | European Pat. Off. . |
| 257 423 A2 | 3/1988 | European Pat. Off. . |
| 373 426 A2 | 6/1990 | European Pat. Off. . |
| 3211976 | 10/1982 | Germany . |

OTHER PUBLICATIONS

Derwent English Abstract for EP–257 423 (Mar. 2, 1988).
Derwent English Abstract for EP–373 426 (Jun. 20, 1990).
Derwent English Abstract for EP–90 396 (May 28, 1986).
Derwent English Abstract for EP–23 265 (Jul. 6, 1983).
Derwent English Abstract for DE–3,211,976 (Oct. 1, 1982).

*Primary Examiner*—C. Melissa Koslow
*Attorney, Agent, or Firm*—Connolly Bove Lodge & Hutz LLP

[57] ABSTRACT

Magnetic iron oxide-containing granules for producing toners or inks, the granules comprising 95.0 to 99.8 wt. % of a magnetic iron oxide-containing compound and 0.2 to 5.0 wt. % of a binder, wherein the magnetic iron oxide-containing compound has an iron content of 50 to 73 wt. %, and wherein the granules have the following properties: a lightness under brightening L* of 40 to 79 CIELAB units, a color cast a* of −1.0 to 4.0 CIELAB units, a color cast b* of 0.0 to −7.0 CIELAB units, an average particle size of 30 to 250 $\mu$m, and a residue of less than 2 wt. % in a flow properties test having a 1 mm sieve and 400 strokes.

20 Claims, No Drawings

USE OF FREE-FLOWING, MAGNETIC IRON OXIDE CONTAINING GRANULES WITH 50 TO 73 WT. % IRON CONTENT

BACKGROUND OF THE INVENTION

1. Field of the Invention

The invention relates to the use of free-flowing iron oxides with 50 to 73 wt. % iron.

2. Description of the Prior Art

Particulate magnetites produced by precipitation processes from aqueous solutions have been known for a long time. In U.S. Pat. No. 802,928, the production of magnetite by the precipitation of iron(II) sulphate with an alkaline component and subsequent oxidation with air is described. Numerous other applications relating to the production of magnetites by the precipitation process were subsequently filed. The iron oxides produced were initially used for the production of all types of paints. The particular advantage of magnetites compared with organic dyes and carbon black lies in their very much better weathering resistance, so that paints of this type can also be used outdoors. Furthermore, precipitation magnetites are used for colouring concrete mouldings, such as concrete paving stones or concrete roofing tiles. Magnetites have also been used for some time in electrophotography for the production of toners.

Magnetites produced by the precipitation process are preferably used to produce toners for copiers with single-component toners. The magnetic toner used for this purpose must have various general properties. As copiers and printers continue to be developed and improved, the requirements of the magnetic toner and, consequently, of the magnetite used for it, have become increasingly high. The latest generation of printers achieves a resolution of more than 600 dpi (dots per inch), which has led to the development of fine particle size toners with a very narrow particle size distribution. This means that the magnetites required for them must have a very narrow particle size distribution. Moreover, a particular particle size is required so that a homogeneous distribution of the magnetite particles in the finished toner is ensured. The magnetites available on the market for the production of toners are powders which meet these requirements. However, these powdered precipitation magnetites have poor flow properties. Metering of the powdered magnetite is therefore difficult and labour-intensive. Moreover, the powdered pigments tend to give off dust. For these reasons, granules would be more suitable than powders. The disadvantage of granules, on the other hand, is that they have to be dispersible. Hard, strong, readily transported and metered, free-flowing granules are usually poorly dispersible. Soft granules are readily dispersible, but not usually transportable, and disintegrate back into powders when handled.

In U.S. Pat. No. 5,401,313, among other things, special pigment granules are described which are produced from the corresponding powders with at least one additive to modify the surface charge and at least one dispersion-promoting additive. These granules may also be used in magnetic toner compositions.

The object of the present application was therefore to provide magnetic iron oxide-containing granules that may be used in toners, printing inks and inks and that have the following properties:

good flow properties
high colour intensity
largely dust-free
readily metered
readily transported in metering equipment
good dispersibility
formulation compatibility.

It was possible to achieve this object with specific granules.

SUMMARY OF THE INVENTION

The invention relates to the use of granules for the production of toners, printing inks and inks, comprising 95.0 to 99.8 wt. % of a magnetic iron oxide-containing compound having an iron content of 50 to 73 wt. %, a lightness under brightening $L^*$ of 40 to 79 CIELAB units, a colour cast $a^*$ of −1.0 to 4.0 CIELAB units and a colour cast $b^*$ of 0.0 to −7.0 CIELAB units, an average particle size (in diameter) of 30 to 250 $\mu$m and a residue of less than 2 wt. % in the flow properties test with a 1 mm sieve with 400 strokes, and a binder in a quantity of 0.2 to 5.0 wt. % selected from the group of compounds consisting of polysiloxanes, polyesters, monohydric or polyhydric polyalcohols, long-chain fatty acids and fatty acid esters with more than 10 carbon atoms, organometallic compounds, polyacrylates and polyvinyl alcohols.

DESCRIPTION OF THE PREFERRED EMBODIMENTS

The granules are preferably produced with siloxanes or with organometallic compounds as binders.

The quantity of binder is preferably 0.5 to 2.0 wt. %. If the quantities of binder used are too small, the granules obtained will not be sufficiently strong and if the quantity of binder added is too great, this quantity may cause problems with the toner production.

In U.S. Pat. No. 5,401,313, at least two additives must be added. This means that the quantity of additive is relatively high, which may have a negative effect on the formulation compatibility, among other things, and that production is costly.

The granules used according to the invention have good properties such as good flow properties, good dispersibility, low abrasion and are compatible with the toner formulations.

The granules used may be produced by various processes. Possible processes are, e.g.:

spray granulation
disk granulation
press granulation.

In the case of granulation processes which start from the suspension, the binder, which usually consists of a liquid or a solution, is added to a known quantity of the pigment dispersed in water. Dispersing is achieved by equipment such as mechanical stirrers, continuous flow disperser units, jet pumps or similar equipment. The suspension is then converted into granules by a suitable granulation process. Spray granulation is particularly suitable for granulating pigments present in suspension.

Spray granulation may, for example, be carried out as follows:

An aqueous dispersion of the magnetic iron oxide-containing compound is produced by breaking up a filter cake using a high-speed stirrer or continuous flow disperser units by the rotor-stator principle. This dispersion contains 150–500 g/l of magnetite.

The binder is added to this dispersion in liquid form (either pure or dissolved in a suitable solvent).

This dispersion is mixed for 10 min to 240 min by stirring, pumping or passing through the continuous flow disperser unit, so that the binder is homo-geneously distributed in the dispersion.

The finished dispersion is sprayed in a nozzle or disk spray drier. The exhaust gas temperature should be 110–140° C. The speed of the disk is selected such that the desired granule size is obtained (depends on the throughput and the size of the spray drier).

When a nozzle spray drier is used, the particle size is determined by the throughput, the pressure and the nozzle cross section.

In the case of granulation processes starting from dry pigments, the binder—a liquid or solution is usually used here too—is added to the pigment powder in a suitable mixer. Mixing is then carried out for a sufficient length of time and the granulation step is subsequently performed. The particle size and strength of the granules are influenced by adjusting the process parameters. In the case of press granulation, for example, a stronger granule may be obtained by increasing the compression pressure. In spray granulation, the particle size is influenced by the nozzle diameter and the rate of drying.

To determine the properties of the granules, the following test methods are used:

1. Colour values are determined by preparing a lacquer. Before the measurement, 3.2 g of the magnetic iron oxide-containing compound are ground using a Micro-dismembrator (30") (Braun) with a 10 mm diameter agate ball. 2.0 g of the binder Alkydal® F48 (a product of Bayer AG), 0.1 g of the ground magnetic iron oxide-containing compound to be tested and 1.0 g of $TiO_2$ (Bayertitan® R-FK2 (a product of Bayer AG)) are then ground on a disk grinding machine from Engelsmann. The colour values L* (lightness), a* (redness) and b* (blueness) are determined by measuring in accordance with DIN 55 986 with Dataflash 2000 (d/8°), apparatus A and by calculation using the CIELAB2 evaluation program of Oct. 19, 1989.

2. Elemental analysis of Fe, Fe(II), Fe(III); determination in accordance with DIN 55 913:

The Fe(II) content is determined by titration with $KMnO_4$ by means of a Memotitrator (Mettler DL-70). Fe(III) is determined in the same way with $TiCl_3$. The total iron content is calculated from the two individual values and the weighed quantity. The contents of the two standard solutions are determined daily.

3. Testing the flow properties

The granule sample was first passed through a sieve with a 2.5 mm mesh size. 50 g thereof were weighed into a sieve jar (diameter=76 mm; height=94 mm) with an intermediate sieve plate with a 1 mm mesh size. The sieve jar with the weighed portion was placed in a collecting jar with a 102 mm diameter and a height of 163 mm. At the bottom of the collecting jar was a bayonet seal. This was used to place the jar on a tamp volumeter according to DIN/ISO 787, part 11 and tamping was performed up to 400 times. If the flow properties are very good, the number of tamping strokes may be reduced to up to 25. The flow properties were expressed as wt. % of residue on the 1 mm sieve in the sieve jar.

$$\text{wt.\% [flow properties]} = \frac{\text{g residue} \times 100}{\text{g weighed portion}}$$

Smaller residue values mean better flow properties.

The invention will be explained in more detail with the aid of the following Examples.

EXAMPLES

Example 1

A magnetic iron oxide-containing compound with an Fe content of 69.0 wt. % was adjusted to a concentration of 300 g/l with water in a stirred vessel. 1.25 wt. % of the after-treatment agent KR-TTS (a product of Kenrich Petrochemicals, tris-2-propyl isostearyl titanate, $C57H11207Ti$) was pumped into this suspension. It was then stirred for 30 minutes and spray-dried using a disk spray drier with a throughput of 10 l/h at a speed of 10000 l/min. The granules obtained were free-flowing and had the following properties:

Lightness L*: 50.0 CIELAB units a*: 0.5 CIELAB units b*: −3.7 CIELAB units

Flow properties as residue after 100 strokes in 1 mm sieve: <1 wt. % KR-TTS: 1.05 wt. %

Owing to its good flow properties, this product is particularly suitable for the production of toners.

Comparative Example 1

The same magnetic iron oxide-containing compound was spray-dried at 18000 l/min without an after-treatment agent. On testing the flow properties, a residue of 18 wt. % was found after 400 strokes.

Comparative Example 2

The same magnetic iron oxide-containing compound was spray-dried with 1.25 wt. % of the after-treatment agent of Example 1 at 18 000 l/min. On testing the flow properties, a residue of 5 wt. % was found after 400 strokes.

What is claimed is:

1. Magnetic iron oxide-containing granules comprising 95.0 to 99.8 wt. % of a magnetic iron oxide-containing compound and 0.2 to 5.0 wt. % of a binder, wherein the magnetic iron oxide-containing compound has an iron content of 50 to 73 wt. %, wherein the granules have the following properties: a lightness under brightening L* of 40 to 79 CIELAB units, a color cast a* of −1 .0 to 4.0 CIELAB units, a color cast b* of 0.0 to −7.0 CIELAB units, an average particle size of 30 to 250 $\mu$m, and a residue of less than 2 wt. % in a flow properties test having a 1 mm sieve and 400 strokes and wherein the binder comprises a compound selected from the group consisting of polysiloxanes, polyesters, polyalcohols, long-chain fatty acids having more than 10 carbons, fatty acid esters having more than 10 carbon atoms, organometallic compounds and polyvinyl alcohols.

2. The granules according to claim 1, wherein the binder is the polysiloxane compound, the fatty acid ester compound having more than 10 carbon atoms, or the organometallic compound.

3. The granules according to claim 2, wherein the organometallic compound is tris-2-propyl isostearyl titanate.

4. The granules according to claim 1, comprising 0.5 to 2.0 wt. % of the binder.

5. The granules according to claim 1, wherein the orpanometallic compound is tris-2-propyl isostearyl titanate, the magnetic iron oxide-containing compound has an iron content of about 69.0 wt. %. and the residue is less than 1 wt. % in a flow properties test having a 1 mm sieve and 100 strokes.

6. The granules according to claim 1, wherein the magnetic iron oxide-containing compound has an iron content of about 69.0 wt. %.

7. The granules according to claim 1, produced by a spray, disk or press granulation process.

8. The granules according to claim 7, wherein the process comprises the steps of:
   a) dispersing the magnetic iron oxide-containing compound to form an aqueous dispersion;
   b) adding a liquified form of the binder to the disperion;
   c) mixing the dispersion containing the binder until the binder is homogeneously distributed in the dispersion; and
   d) spraying the mixed dispersion in a nozzle or disk spray drier.

9. The granules according to claim 7, wherein the process comprises the steps of:
   a) adding the binder to a dry form of the magnetic iron oxide-containing compound;
   b) mixing the binder and magnetic iron oxide-containing compound for an effective period of time to form a homogeneous mixture and initiate granulation; and
   c) spraying the homogeneous mixture in a nozzle or disk spray drier, or pressing the homogeneous mixture in a press.

10. The granules according to claim 1, wherein the polyalcohols are monohydric or polyhydric.

11. A toner or ink prepared from the granules according to claim 1.

12. A toner or ink consisting essentially of a composition prepared from magnetic iron oxide-containing granules consisting essentially of 95.0 to 99.8 wt. % of a magnetic iron oxide-containing compound and 0.2 to 5.0 wt. % of a binder, wherein the magnetic iron oxide-containing compound has an iron content of 50 to 73 wt. %, wherein the granules have the following properties: a lightness under brightening L* of 40 to 79 CIELAB units, a color cast a* of −1.0 to 4.0 CIELAB units, a color cast b* of 0.0 to −7.0 CIELAB units, an average particle size of 30 to 250 µm, and a residue of less than 2 wt. % in a flow properties test having a 1 mm sieve and 400 strokes, and wherein the binder is a polysiloxane, polyester, polyacrylate, polyalcohol, long-chain fatty acid having more than 10 carbons, fatty acid ester having more than 10 carbon atoms, organometallic compound or polyvinyl alcohol.

13. The toner or ink according to claim 12, wherein the polyalcohol is monohydric or polyhydric.

14. The toner or ink according to claim 12, wherein the binder is the polysiloxane compound, the fatty acid ester compound having more than 10 carbon atoms, or the organometallic compound.

15. The toner or ink according to claim 14, wherein the organometallic compound is tris-2-propyl isostearyl titanate.

16. The toner or ink according to claim 12, wherein 0.5 to 2.0 wt.% of the binder is present in the magnetic iron oxide-containing granules.

17. The toner or ink according to claim 12, wherein the magnetic iron oxide-containing compound has an iron content of about 69.0 wt.%.

18. The toner or ink according to claim 12, wherein the magnetic iron oxide-containing granules are produced by a spray, disk or a press granulation process.

19. The toner or ink according to claim 18, wherein the process for producing the magnetic iron oxide-containing granules comprises of:
   a) dispersing the magnetic iron oxide-containing compound to form an aqueous dispersion;
   b) adding a liquified form of the binder to the dispersion;
   c) mixing the dispersion containing the binder until the binder is homogeneously distributed in the dispersion; and
   d) spraying the mixed dispersion in a nozzle or disk spray drier.

20. The toner or ink according to claim 18, wherein the process for producing the magnetic iron-containing granules comprises the steps of:
   a) adding the binder to a dry form of the magnetic iron oxide-containing compound;
   b) mixing the binder and magnetic iron oxide-containing compound for an effective period of time to form a homogeneous mixture and initiate granulation; and
   c) spraying the homogeneous mixture in a nozzle or disk spray drier, or pressing the homogeneous mixture in a press.

* * * * *